United States Patent
Lu et al.

(10) Patent No.: US 9,041,870 B2
(45) Date of Patent: May 26, 2015

(54) OPPOSED SUBSTRATE, MANUFACTURING METHOD THEREOF AND LCD TOUCH PANEL

(71) Applicants: BOE Technology Group Co., Ltd., Beijing (CN); Chengdu BOE Optoelectronics Technology Co., Ltd., Chengdu (CN)

(72) Inventors: Youqiang Lu, Beijing (CN); Fan Li, Beijing (CN); Jing Wang, Beijing (CN); Tianma Li, Beijing (CN); Yun Qiu, Beijing (CN)

(73) Assignees: BOE Technology Group Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 85 days.

(21) Appl. No.: 13/983,717

(22) PCT Filed: Mar. 21, 2013

(86) PCT No.: PCT/CN2013/073013
§ 371 (c)(1),
(2) Date: Aug. 5, 2013

(87) PCT Pub. No.: WO2013/181961
PCT Pub. Date: Dec. 12, 2013

(65) Prior Publication Data
US 2014/0055689 A1 Feb. 27, 2014

(30) Foreign Application Priority Data

Jun. 4, 2012 (CN) .......................... 2012 2 0261280

(51) Int. Cl.
*G02F 1/133* (2006.01)
*G02F 1/1333* (2006.01)
(Continued)

(52) U.S. Cl.
CPC .......... *G02F 1/13338* (2013.01); *G02F 1/1309* (2013.01); *G02F 1/136259* (2013.01);
(Continued)

(58) Field of Classification Search
CPC .......... G02F 1/13338; G02F 1/136259; G02F 1/1309; G06F 3/0412
See application file for complete search history.

(56) References Cited

U.S. PATENT DOCUMENTS

| 2010/0026661 A1 | 2/2010 | Teramoto |
| 2011/0169783 A1 | 7/2011 | Wang et al. |
| 2014/0055689 A1 | 2/2014 | Lu et al. |

FOREIGN PATENT DOCUMENTS

| CN | 101763202 A | 1/2010 |
| CN | 101639580 A | 2/2010 |

(Continued)

OTHER PUBLICATIONS

International Search Report for International Application No. PCT/CN2013/073013 issued Jul. 4, 2013, 15pgs.
(Continued)

*Primary Examiner* — Phu Vu

(57) ABSTRACT

An opposed substrate (9') comprises: a substrate (1); a static electricity protective electrode (2), a bridging electrode (4) and a touch induction electrode (6) comprising a plurality of sub-units sequentially formed on the substrate (1), wherein the distribution of the static electricity protective electrode (2) on the substrate (1) corresponds to dummy regions between sub-units, and the static electricity protective electrode (2), the bridging electrode (4) and the touch induction electrode (6) are insulated from each other. The opposed substrate (9') has a good touching effect. A method for manufacturing the opposed substrate, and a liquid crystal display touch panel are also disclosed.

15 Claims, 3 Drawing Sheets

(51) Int. Cl.
　　*G02F 1/13*　　　(2006.01)
　　*G02F 1/1362*　(2006.01)
　　*G06F 3/041*　　(2006.01)
　　*G06F 3/044*　　(2006.01)
(52) U.S. Cl.
　　CPC .............. *G06F3/0412* (2013.01); *G06F 3/044* (2013.01); *G06F 2203/04103* (2013.01); *G06F 2203/04107* (2013.01); *G06F 2203/04111* (2013.01); *G02F 2001/133334* (2013.01)

(56) References Cited

FOREIGN PATENT DOCUMENTS

| | | |
|---|---|---|
| CN | 101655755 A | 2/2010 |
| CN | 202600304 U | 6/2012 |

OTHER PUBLICATIONS

PCT International Preliminary Report on Patentability issued by the International Bureau of WIPO on Dec. 9, 2014 for International Application No. PCT/CN2013/073013, 15 pages.

OPPOSED SUBSTRATE, MANUFACTURING METHOD THEREOF AND LCD TOUCH PANEL

CROSS REFERENCE TO RELATED APPLICATIONS

This application is based on International Application No PCT/CN2013/073013 filed on Mar. 21, 2013, which claims priority to Chinese National Application No. 201220261280.8, filed on Jun. 4, 2012, the contents of which are incorporated herein by reference.

TECHNICAL FIELD

Embodiments of the present invention relate to the field of liquid crystal displays, in particularly to an opposed substrate, a manufacturing method thereof and a liquid crystal display touch panel.

BACKGROUND

Touch screens are common information entry equipments at present, which allow man machine interaction in a simple, convenient and natural way, and become a new type of multimedia interactive equipments. Capacitive touch screens have advantages such as sensitive touch response and support for multipoint touch. The Advanced-super Dimensional Switching technology (ADS) can improve the picture quality of TFT-LCDs and has advantages of high resolution, high transmissivity, low power dissipation, wide viewing angles, high opening ratio, low chromatic aberration, and no push mura, etc. In view of the above, ADS capacitive touch screens have become popular for medium and high end mobile phones in the world.

FIG. 1 is a simplified schematic diagram showing the structure of an ADS type TFT-LCD. With reference to FIG. 1, a prior art ADS type TFT-LCD comprises: an array substrate 8, a color filter substrate 9 and a liquid crystal layer 10 filled in between the array substrate 8 and the color filter substrate 9, wherein the array substrate 8 has strip common electrodes 81 formed on a side close to the liquid crystal layer 10, and the common electrodes 81 can form planar electric fields in the liquid crystal layer 10 which can control deflection of liquid crystal molecules in the liquid crystal layer 10 for liquid crystal display; the color filter substrate 9 has a layer of transparent conductive film 91 deposited on its back surface to mitigate influence of static electricity in external environment on display quality.

It can be seen that a layer of transparent conductive film function as a static electricity protective layer is deposited on the back surface of the color filter substrate during manufacturing process of prior art ADS TFT-LCD to mitigate influence of static electricity in external environment on the display quality. In addition, during the manufacturing process of a capacitive touch screen, a metal film and a transparent conductive film are deposited sequentially on a glass substrate. If a capacitive touch screen is made on an existing ADS product, the static electricity protective layer (e.g. ITO layer) of the ADS product will certainly form a large capacitance with the capacitive touch layer (e.g. ITO layer), thereby compromising sensitivity of touch response. However, omitting the static electricity protective layer for ADS will influence display quality of a LCD.

SUMMARY

An object of the present invention is to provide an opposed substrate, a manufacturing method thereof and a liquid crystal display touch panel that ensure high display quality while ensuring good touch effect.

According to the first aspect of the present invention, there is provided an opposed substrate for touch liquid crystal display, comprising:
a substrate;
a static electricity protective electrode formed over the substrate;
a bridging electrode formed over the static electricity protective electrode; and
a touch induction electrode formed over the bridging electrode, wherein the touch induction electrode comprises at least two transverse sub-units and at least two longitudinal sub-units, distribution of the static electricity protective electrode on the substrate corresponds to dummy regions between the at least two transverse sub-units and the at least two longitudinal sub-units, wherein the static electricity protective electrode, the bridging electrode and the touch induction electrode are insulated from each other.

According to the second aspect of the present invention, there is provided a liquid crystal display touch panel, comprising: an array substrate, the above-mentioned opposed substrate and a liquid crystal layer filled in between the array substrate and the opposed substrate.

According to the third aspect of the present invention, there is provided a method for manufacturing an opposed substrate, comprising:
providing a substrate;
forming a static electricity protective electrode over the substrate;
forming a bridging electrode over the static electricity protective electrode; and
forming a touch induction electrode over the bridging electrode, wherein the touch induction electrode comprises at least two transverse sub-units and at least two longitudinal sub-units, distribution of the static electricity protective electrode on the substrate corresponds to dummy regions between the at least two transverse sub-units and the at least two longitudinal sub-units, wherein the static electricity protective electrode, the bridging electrode and the touch induction electrode are insulated from each other.

Compared with prior art, the present invention both ensures high display quality and ensures good touch effect by modifying the pattern of the static electricity protective layer's ITO and making it cooperate with the capacitive touch layer's ITO.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "comprises," "comprising," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

The present invention proposes a improved ADS type capacitive touch structure that both ensures high display quality and ensures good touch effect by modifying the pattern of the static electricity protective layer's ITO and making it cooperate with the capacitive touch layer's ITO. The ADS type capacitive touch structure is formed on an opposed substrate disposed opposite to an array substrate in the liquid crystal display panel. A color filter substrate is taken as an example of opposed substrate for the following description, however the opposed substrate in embodiments of the present invention is not limited to the color filter substrate, and other opposed substrates without color filter resin layers formed thereon are also encompassed within the scope of the present invention.

Figure 1:
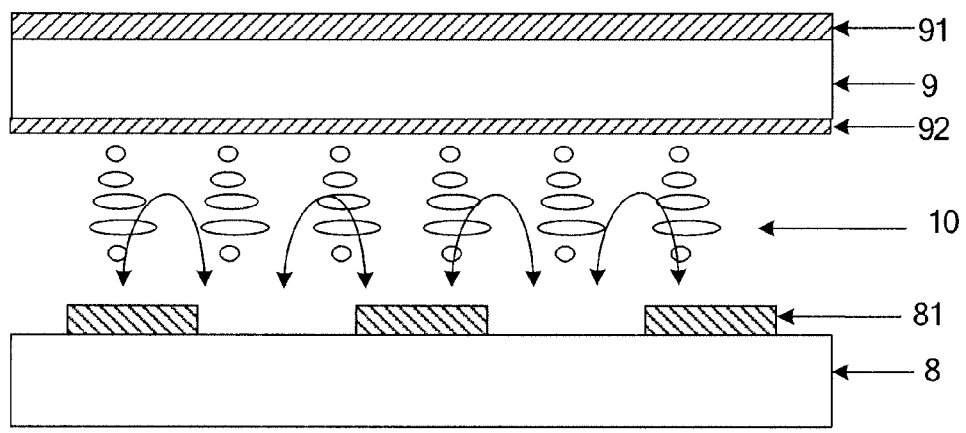
FIG. 1 is a schematic diagram showing a structure of a prior art ADS type TFT-LCD.
Figure 2:
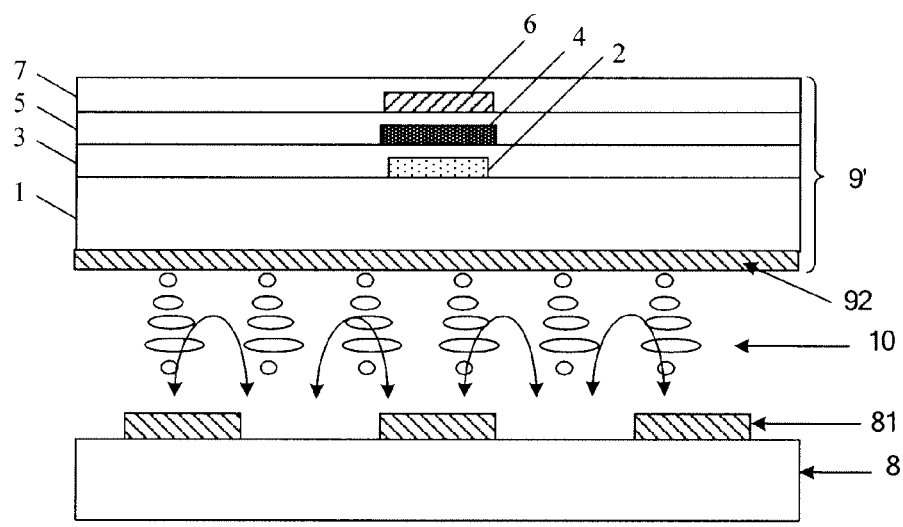
FIG. 2 is a schematic diagram showing a structure of a liquid crystal display touch panel according to a preferred embodiment of the present invention.

FIG. 2 is a schematic diagram showing the structure of a liquid crystal display touch panel according to a preferred embodiment of the present invention. Referring to FIG. 2, the liquid crystal display touch panel may comprise: an array substrate 8, a color filter substrate 9' and a liquid crystal layer 10 filled in between the array substrate 8 and the color filter substrate 9'.

The array substrate 8 has strip common electrodes 81 formed on a side close to the liquid crystal layer 10, and common electrodes 81 can form a planar electric field in the liquid crystal layer 10 which can control deflection of liquid crystal molecules in the liquid crystal layer 10 for liquid crystal display.

The color filter substrate 9' may comprise: a substrate 1; a color resin layer 92 formed on one side (facing the liquid crystal layer 10) of the substrate 1; a static electricity protective electrode 2 formed on the other side (opposite to the liquid crystal layer 10) of the substrate 1; a bridging electrode 4 formed over the static electricity protective electrode 2; and a touch induction electrodes 6 formed over the bridging electrode 4.

Figure 3:
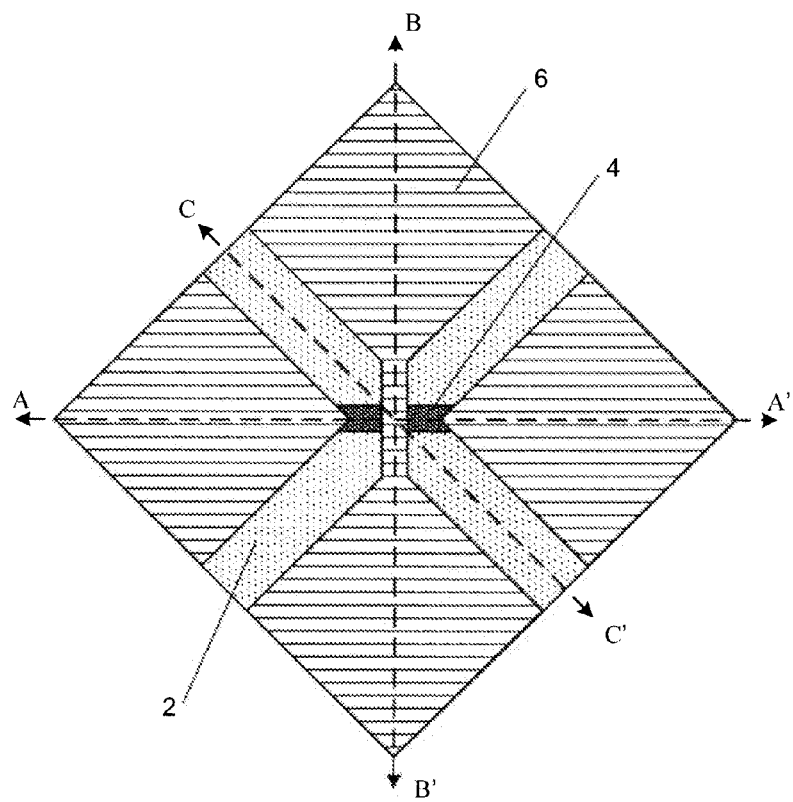
FIG. 3 is a top view showing a capacitive touch structure of a liquid crystal display touch panel according to a preferred embodiment of the present invention.

Referring to FIG. 3, a touch induction electrode 6 comprises two transverse sub-units and two longitudinal sub-units separated from each other with dummy regions therebetween. Preferably, the dummy regions have the same width. The distribution of static electricity protective electrode 2 on the substrate 1 corresponds to dummy regions between the two transverse sub-units and the two longitudinal sub-units, and the two longitudinal sub-units are connected directly while the two transverse sub-units are connected by a bridging electrode 4.

It is noted that the touch induction electrode 6 illustrated in FIG. 3 is of a diamond shape with the two longitudinal sub-units connected with each other directly. Of course, for a touch induction electrode of diamond shape, it is also possible that the two transverse sub-units are connected directly, in which case, the two longitudinal sub-units are connected by the bridging electrode 4. In addition, the above-mentioned embodiment may also be applied to touch induction electrodes of other shapes, such as touch induction electrodes with square and rectangular shapes. Then, the connection between transverse sub-units and between longitudinal sub-units as well as the distribution of static electricity protective electrode may be implemented similarly to FIG. 3. In other embodiments of the present invention, the touch induction electrode 6 may also comprise more than two transverse or longitudinal sub-units, e.g., three longitudinal sub-units and three transverse sub-units.

Transparent conducting materials may be used for static electricity protective electrode 2 and touch induction electrode 6, comprising, but not limited to indium tin oxide, indium zinc oxide and aluminum zinc oxide. Metal materials may be used for bridging electrode 4, comprising, but not limited to aluminum, chromium, tungsten, tantalum, titanium and molybdenum.

In addition, the color filter substrate 9' may further comprise: a first insulating layer 3 formed between bridging electrode 4 and static electricity protective electrode 2 for insulating and isolating bridging electrode 4 from static electricity protective electrode 2; a second insulating layer 5 formed between touch induction electrodes 6 and bridging electrode 4 for insulating and isolating touch induction electrodes 6 from bridging electrode 4; and a third insulating layer 7 formed over touch induction electrodes 6 for protecting touch induction electrodes 6. Photosensitive resin materials (OC) may be used for the first insulating layer 3, the second insulating layer 5 and the third insulating layer 7.

With the above-mentioned liquid crystal display touch panel, since the distribution of static electricity protective electrode 2 on the substrate 1 corresponds to dummy regions between transverse sub-units and longitudinal sub-units, thus static electricity protective electrode 2 and sub-units forms a complementary structure, which is used for preventing static electricity. Then, it is impossible to form a large capacitance between the static electricity protective layer's ITO, i.e. static electricity protective electrode 2, and the capacitive touch layer's ITO, i.e. touch induction electrodes 6, hence avoiding significant influence on sensitivity of touch induction.

Figure 4:
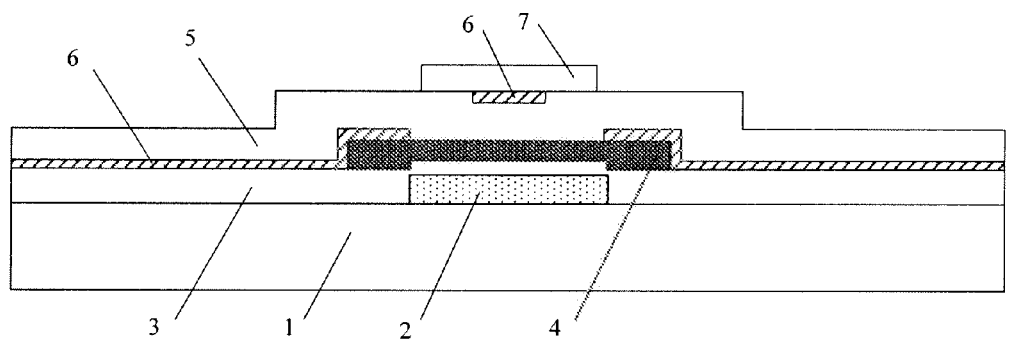
FIG. 4 is a schematic cross section diagram taken along line A-A' of FIG. 3.
Figure 5:
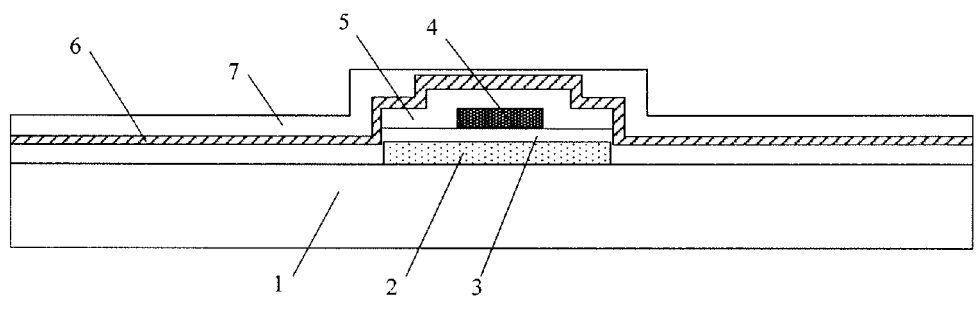
FIG. 5 is a schematic cross section diagram taken along line B-B' of FIG. 3.
Figure 6:
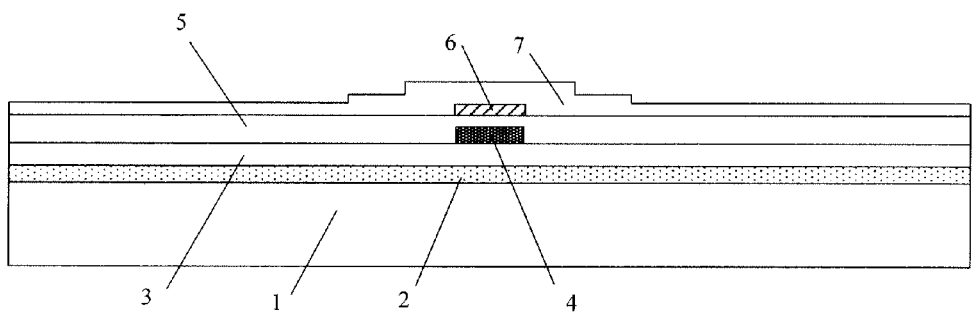
FIG. 6 is a schematic cross section diagram taken along line C-C' of FIG. 3.

Further, with the above-mentioned distribution of static electricity protective electrode 2, bridging electrode 4 and touch induction electrodes 6, it is also possible to mitigate influence of static electricity in external environment on display quality. Specifically, with reference to FIG. 4, static charges accumulated in A-A' direction will be released via a conducting path formed by touch induction electrodes 6 and bridging electrode 4. With reference to FIG. 5, static charges accumulated in B-B' direction will be released via a path formed by touch induction electrodes 6. With reference to FIG. 6, static charges accumulated in dummy regions between transverse sub-units and longitudinal sub-units of touch induction electrodes 6 will be released via a path formed by static electricity protective electrode 2.

Embodiments of the present invention further provide a touch liquid crystal display device comprising the above-mentioned liquid crystal display touch panel.

Embodiments of the present invention further provide a method for manufacturing an opposed substrate, comprising:
providing a substrate 1;
forming a static electricity protective electrode 2 over the substrate 1; forming a bridging electrode 4 over the static electricity protective electrode 2; and forming touch induction electrode 6 over a bridging electrode 4. The touch induction electrode 6 comprises two transverse sub-units and two longitudinal sub-units. The distribution of static electricity protective electrode 2 on the substrate 1 corresponds to dummy regions between two transverse sub-units and two longitudinal sub-units, wherein static electricity protective electrode 2, bridging electrode 4 and touch induction electrode 6 are insulated from each other.

In one example, the method further comprises:
forming a first insulating layer 3 between the bridging electrode 4 and the static electricity protective electrode 2;
forming a second insulating layer 5 between the touch induction electrode 6 and the bridging electrode 4; and
forming a third insulating layer 7 over the touch induction electrode 6.

In one example, the two transverse sub-units are connected with each other directly, and the two longitudinal sub-units are connected with each other by a bridging electrode 4. Alternatively, the two longitudinal sub-units are connected with each other directly, and the two transverse sub-units are connected with each other by a bridging electrode 4.

In one example, the first insulating layer 3, the second insulating layer 5 and the third insulating layer 7 are formed of photosensitive resin material. Static electricity protective electrode 2 and touch induction electrode 6 are formed of transparent conducting material. Bridging electrode 4 is formed of metal material.

In one example, the method further comprises: forming a color filter resin layer 92 on a surface of the substrate 1 opposite to static electricity protective electrode 2.

When the array substrate is one formed with color filters, such as a COA substrate, or when the liquid crystal display device has a back light source such as a field sequential RGB light emitting diodes (LED), no color resin layer is necessary for the opposed substrate to obtain a color filter substrate.

What are described above is related to the illustrative embodiments of the disclosure only and not limitative to the scope of the disclosure; the scopes of the disclosure are defined by the accompanying claims.

The invention claimed is:
1. An opposed substrate for touch liquid crystal display, comprising:
a substrate;
a static electricity protective electrode formed over the substrate;
a bridging electrode formed over the static electricity protective electrode; and
a touch induction electrode formed over the bridging electrode, wherein the touch induction electrode comprises at least two transverse sub-units and at least two longitudinal sub-units, distribution of the static electricity protective electrode on the substrate corresponds to dummy regions between the at least two transverse sub-units and the at least two longitudinal sub-units, wherein the static electricity protective electrode, the bridging electrode and the touch induction electrode are insulated from each other.

2. The opposed substrate of claim 1, wherein the at least two transverse sub-units are connected with each other directly, the at least two longitudinal sub-units are connected with each other by the bridging electrodes; or
the at least two longitudinal sub-units are connected with each other directly, the at least two transverse sub-units are connected with each other by the bridging electrode.

3. The opposed substrate of claim 1, further comprising:
a first insulating layer formed between the bridging electrode and the static electricity protective electrode;
a second insulating layer formed between the touch induction electrode and the bridging electrode; and
a third insulating layer formed over the touch induction electrode.

4. The opposed substrate of claim 3, wherein the first insulating layer, the second insulating layer and the third insulating layer are formed of photosensitive resin material.

5. The opposed substrate of claim 1, wherein the static electricity protective electrode and the touch induction electrode are formed of transparent conducting material.

6. The opposed substrate of claim 1, wherein the bridging electrode are formed of metal material.

7. The opposed substrate of claim 1, further comprising a color filter resin layer formed on a surface of the substrate opposite to the static electricity protective electrode.

8. A liquid crystal display touch panel comprising: an array substrate, an opposed substrate of claim 1 and a liquid crystal layer filled in between the array substrate and the opposed substrate.

9. A method for manufacturing an opposed substrate, comprising:
providing a substrate;
forming a static electricity protective electrode over the substrate;
forming a bridging electrode over the static electricity protective electrode; and
forming a touch induction electrode over the bridging electrode, wherein the touch induction electrode comprises at least two transverse sub-units and at least two longitudinal sub-units, distribution of the static electricity protective electrode on the substrate corresponds to dummy regions between the at least two transverse sub-units and the at least two longitudinal sub-units, wherein the static electricity protective electrode, the bridging electrode and the touch induction electrode are insulated from each other.

10. The method of claim 9, wherein the at least two transverse sub-units are connected with each other directly, the at least two longitudinal sub-units are connected with each other by the bridging electrode; or
the at least two longitudinal sub-units are connected with each other directly, the at least two transverse sub-units are connected with each other by the bridging electrode.

11. The method of claim 9, further comprising:
 forming a first insulating layer between the bridging electrode and the static electricity protective electrode;
 forming a second insulating layer between the touch induction electrode and the bridging electrode; and
 forming a third insulating layer over the touch induction electrode.

12. The method of claim 11, wherein the first insulating layer, the second insulating layer and the third insulating layer are formed of photosensitive resin material.

13. The method of claim 9, wherein the static electricity protective electrode and the touch induction electrode are formed of transparent conducting material.

14. The method of claim 9, wherein the bridging electrode are formed of metal material.

15. The method of claim 9, further comprising forming a color filter resin layer on a surface of the substrate opposite to the static electricity protective electrode.

\* \* \* \* \*